(12) United States Patent
Wang

(10) Patent No.: US 10,486,075 B2
(45) Date of Patent: Nov. 26, 2019

(54) SITTABLE UNIVERSAL MOTION PLATFORM

(71) Applicant: Hangzhou Virtual And Reality Technology Co., LTD., Hangzhou (CN)

(72) Inventor: Bo Wang, Hangzhou (CN)

(73) Assignee: HANGZHOU VIRTUAL AND REALITY TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/032,077

(22) Filed: Jul. 11, 2018

(65) Prior Publication Data
US 2019/0275435 A1    Sep. 12, 2019

(30) Foreign Application Priority Data
Mar. 12, 2018    (CN) .......................... 2018 1 0201056

(51) Int. Cl.
*A63G 31/16* (2006.01)
*A63F 13/98* (2014.01)
*A47C 3/24* (2006.01)
*A47C 1/00* (2006.01)

(52) U.S. Cl.
CPC ............... *A63G 31/16* (2013.01); *A47C 1/00* (2013.01); *A47C 3/24* (2013.01); *A63F 13/98* (2014.09)

(58) Field of Classification Search
CPC ........ A63G 31/00; A63G 31/02; A63G 31/04; A63G 31/16; A63J 5/00; A63J 54/12; A63J 25/00; A47C 1/00; A47C 1/12; A47C 11/0056; A47C 3/24; A63F 13/00; A63F 13/98

USPC .................. 472/59–60, 130, 136; 434/29, 55
See application file for complete search history.

(56) References Cited

U.S. PATENT DOCUMENTS

| 4,961,574 | A  | * | 10/1990 | Lew ................... | A63B 69/0064 280/206 |
| 6,331,152 | B1 | * | 12/2001 | Holle ...................... | A47C 3/02 434/55 |
| 6,988,951 | B1 | * | 1/2006  | Newman ................. | A63G 31/16 472/112 |
| 9,329,681 | B2 | * | 5/2016  | Goetgeluk ............. | G06F 3/011 |

FOREIGN PATENT DOCUMENTS

| CN | 204147489 U | 2/2015 |
| CN | 104971469 A | 10/2015 |

* cited by examiner

*Primary Examiner* — Kien T Nguyen
(74) *Attorney, Agent, or Firm* — Gokalp Bayramoglu

(57) ABSTRACT

The present invention discloses a sittable universal motion platform including a chassis, a support arm and a waist ring, the support arm is rotationally connected with the chassis and provided with an adjusting support; the adjusting support includes a slide carriage and a slide block, the slide block is slidingly connected with the slide carriage and is fixed on the support arm, the slide carriage is connected with the waist ring; and a positioning device is arranged on the adjusting support. The slide carriage is provided with slide rail and the slide block is provided with a corresponding matched chute, the number of slide rails can be two, and the number of corresponding chutes is also two, so that the slide carriage and the slide block can slide at will and can be more stable.

10 Claims, 7 Drawing Sheets

SITTABLE UNIVERSAL MOTION PLATFORM

CROSS REFERENCE TO RELATED APPLICATIONS

This application is based upon and claims priority to Chinese Patent Application No. 201810201056.1, filed on Mar. 12, 2018, the entire contents of which are incorporated herein by reference.

TECHNICAL FIELD

The present invention relates to the technical field of motion detection and control, and relates to the field of control, detection, implementation and application of a rotary motion platform based on virtual reality technology, in particular to a sittable universal motion platform.

BACKGROUND

Virtual reality technology is a kind of computer simulation system which can create and experience virtual world. Virtual reality technology uses computer to create a simulation environment and is a system simulation of multi-source information fusion, interactive three-dimensional dynamic scene, and entity behavior, which makes users immersed in the simulation environment. Virtual reality technology takes the head mounted display technology as the core, supplemented by spatial orientation technology and other peripheral technologies, to build an immersive virtual world. In the non-virtual reality scene, because the user sits before a PC for a long time, for the traditional walking input mode, such as keyboard and handle, the human body gets adapted to use the movement of the fingers instead of the movement of the legs; but for the virtual reality scene which is realized by standing or moving, the immersion feeling created by the virtual reality technology will be destroyed greatly when the traditional peripherals are used to walk in the virtual scene. Using two legs to move is an original movement mode for human to adapt to the long-term evolution, using two legs instead of the traditional keyboards and handles to control the movement in the scene is a more natural interactive mode. At the same time, the movements of the two legs expand the application field of virtual reality, bring additional functions such as fitness, training and so on. Using two legs to move, run, jump and squat need to overcome the contradiction between space and displacement. When the user moves within a small space range in reality, the corresponding movement mapping to the virtual scene is infinite space movement, at the same time, the maximum immersion can let user feel that he is moving in the infinite space.

In order to solve this problem, there are a variety of universal motion platforms for virtual reality in the market, such as a virtual reality human omnidirectional motion input platform of CN Patent Application No. 201510333880.9 using column and beam hanging to support human. The overall height of the equipment is too high and the volume is huge, as well as there are other shortcomings. As another example, a human universal motion platform of CN Patent Application No. 201420555831.0 using the support ring structure to support human, requires both hands hanging on the support ring and may cause numbness in arms after a long-term use; meanwhile, the human universal motion platform also can't realize squat operation.

The chassis adapted by the universal motion platforms are mostly smooth concave chassis, a person can hardly keep the balance of the body during squatting, even if the balance can be kept under the aid of the support ring of the device, the user can feel abnormal fatigue, and moreover, it's hard to match players with different body types and get the players who do not match the device to run, jump and squat like players with the right body type.

SUMMARY

The technical problem to be solved by the present invention is to provide a sittable universal motion platform which is simple in structure, simple in operation and convenient to use.

In order to solve the technical problem, the technical scheme of the invention is as follows:

A sittable universal motion platform, includes a chassis, a support arm and a waist ring, wherein the support arm is rotationally connected with the chassis and provided with an adjusting support, the adjusting support includes a slide carriage and a slide block, the slide block is in sliding connection with the slide carriage; the slide block is fixed on the support arm, the slide carriage is connected with the waist ring; and a positioning device is arranged on the adjusting support. The slide carriage is provided with a slide ray and the slide block is provided with a corresponding matched chute, the number of slide rails can be two, and the number of corresponding chutes is also two, so that the slide carriage can freely slide in relation to the slide block and can be more stable at the same time.

A bottom support is arranged at the bottom of the chassis and is rotationally connected with the chassis, the support arm is rotationally connected with the bottom support, an adaptive folding rod is arranged at the bottom of the support arm, connecting with the bottom support, and rotationally connecting with the bottom support.

The chassis is a concave plate with smooth surface, infinite walking can be realized by the action of gravity on human feet, the support arm is rotationally connected with the chassis, so that a person can move and walk in any direction, and through the design of the slide carriage and the slide block, the waist ring can move in the vertical direction relative to the support arm, so that the height of different users can be adjusted and the waist ring can accurately match the waist position of the user, the movement of the user on the chassis is correspondingly mapped into a virtual game in an infinite space.

Preferably, the positioning device includes a positioning pin and positioning grooves matched with each other and conditionally clamped, the positioning pin is rotationally connected with the slide block; the positioning grooves are arranged on the slide carriage, and a plurality of positioning grooves are arranged in the vertical direction so as to adapt to people with different heights.

Preferably, the positioning pin includes a rotating pin, a positioning stop and a shaft, the shaft passes through the rotating pin and is rotationally connected with the rotating pin; the positioning stop limits the unidirectional rotation of the rotating pin, so that the rotating pin, the positioning groove and the positioning stop can be kept fixed, and the shaft is fixed on the slide block; the tail part of the rotating pin is provided with a handle which is convenient to rotate.

Preferably, a first return spring is arranged on the positioning pin.

Through the arrangement of the rotating pin, the positioning stop and the shaft, the rotating pin rotates around the shaft, when the rotating pin rotates to the position of the positioning stop, the rotating pin cannot rotate further, and the head part of the rotating pin extends into the positioning groove at this time, so the positioning groove cannot move either, and the relative position of the slide block and the slide carriage is fixed.

The positioning stop only blocks the rotation of the rotating pin in the anticlockwise direction and does not block the rotation in the clockwise direction, and the part that the head part of the rotating pin extending into the positioning groove is provided with a bevel structure, so that when the slide carriage moves upwards, the head part of the rotating pin does not block the slide carriage, allowing the rotating pin block the downward movement of the slide carriage through the positioning groove, and the upward movement of the slide carriage is not limited; the tail part of the pin is provided with a handle which is convenient to rotate.

The first return spring can be a torsional spring sleeved on the shaft, and the function of the torsional spring is to give the rotating pin a force for rotating anticlockwise, so that the rotating pin always keeps the anticlockwise rotation close to the positioning stop without the drive of external force.

The first return spring can be a tension spring which is arranged on the tail part of the rotating pin and pulls the tail part of the rotating pin, so that the rotating pin also generates an anticlockwise rotating tendency, and the head part of the rotating pin also keeps close to the positioning stop.

The first return spring can be a pressure spring which is arranged below the tail part of the rotating pin and bounces off the tail part of the rotating pin, so that the rotating pin also generates an anticlockwise rotating tendency, and the head part of the rotating pin also keeps close to the positioning stop.

Preferably, the adjusting support is provided with a two-dimensional free motion adapting mechanism including a vertical motion adapting structure and a horizontal motion adapting structure; the vertical motion adapting mechanism includes a vertical slide rail and a vertical slider, the vertical slide rail and the vertical slider are in sliding connection. The horizontal motion adapting structure includes a horizontal slide rail and a horizontal slider, the horizontal slide rail and the horizontal slider are in sliding connection, the horizontal slider is fixed on the vertical sliding rail, the horizontal slide rail is connected to the waist ring, and the vertical slider is connected to the slide carriage. The vertical slide rail and the horizontal slide rail are respectively two cylindrical guide rods, the vertical slider and the horizontal slider can be correspondingly provided with two cylindrical holes for respectively sliding with the vertical slide rail and the horizontal slide rail.

Preferably, retarding springs are arranged both on the vertical slide rail and the horizontal slide rail. Correspondingly, the springs are sleeved in front of and in rear of the horizontal slider passing through the horizontal slide rail, and the springs are sleeved above the vertical slider passing through the vertical slide rail.

The waist ring can move up and down freely and move back and forth freely relative to the slide carriage, through the vertical motion adapting structure and the horizontal motion adapting structure. The retarding spring plays a buffering role in forward, backward and downward directions respectively, through the retarding spring. The waist ring plays a buffering role when people move forward, move backward and squat correspondingly, and the safety of the platform is improved.

Preferably, the two-dimensional free motion adapting mechanism includes a limiting mechanism including a limiting pin and a slide carriage. The slide carriage is connected and fixed with the vertical slider, the limiting pin passes through the horizontal slider and is in sliding connection with the horizontal slider, the limiting grooves are arranged on the slide carriage, the head part of the limiting pin is clamped with the limiting groove; the slide carriage is parallel to the vertical sliding rail, and the limiting pin is parallel to the horizontal sliding rail. Similarly, there are a plurality of limiting grooves to increase the safe range of movement of the user.

Preferably, the limiting mechanism further includes a compression rod including an f-shaped lever and a hinge pin, the hinge pin passes through the f-shaped lever and is rotationally connected with the f-shaped lever, and is fixed on the horizontal slider. One end of the f-shaped lever presses against the head part of the limiting pin, the other end of the f-shaped lever is connected to the waist ring through a first pull wire, the pull rod end of the f-shaped lever is provided with a pull wire fixing hole for fixing the first pull wire.

Preferably, the limiting pin is I-shaped, namely the head part and the tail part of the limiting pin are provided with cylindrical protrusions which exceed the cross-sectional area of the limiting pin, (the size of the cylindrical protrusions of the head part is matched with the limiting grooves), the horizontal slider is provided with a limiting through hole, the bottom surfaces of the head part and the tail part of the limiting pin are both larger than the cross-sectional area of the limiting through hole, a second return spring is sleeved on the limiting pin, the two ends of the second return spring respectively abut against the tail part of the limiting pin and the horizontal slider, and the preferred second return spring is a pressure spring whose force enables the head part of the limiting pin to automatically return to the initial position without other external forces.

The head part and the tail part of the limiting pin are detachably connected; the head part and the tail part can be connected by threads, and the detachable connection of the head part and the tail part is convenient for the installation and replacement of the limiting pin.

The horizontal slider is provided with accommodation grooves corresponding to the positions of the head part of the limiting pin and the tail part of the limiting pin, both the bottom surfaces of the head part of the limiting pin and the tail part of the limiting pin are smaller than the bottom surface of the accommodation groove; so that the head part of the limiting pin is not exposed outside the horizontal slider in the stationary state, avoiding interference with the movement relative to the limiting plate, and has beautiful appearance. The accommodation grooves arranged near the tail part are used for placing the pressure spring, two ends of the press spring abut against the cylindrical projection of the tail part of the limiting pin and the bottom surface of the accommodation groove respectively.

The second return spring may also be a tension spring, two ends of which are respectively connected to the head part of the limiting pin and the bottom surface of the accommodation groove close to the head part.

Due to the arrangement of the limiting pin and the limiting grooves, when the waist ring moves backward to a certain position, a pressure generated by the waist ring is applied on the compression rod end of the f-shaped lever, and the compression rod end transfers the pressure to the tail part of the limiting pin, thereby pushing the limiting pin to move further into the limiting groove. The limiting pin and the limiting groove are engaged with each other so as to limit the movement of the vertical slide rail relative to the slide carriage, namely, the movement of the vertical slide rail relative to the vertical slider is limited, so that free up and down movement of vertical slide rail cannot be realized.

When the waist ring moves forwards, once the waist ring moves to a certain position, the pull rod end of the f-shaped lever moves forwards along with the waist ring through the pulling of the first pull wire, so that the compression rod end is subjected to pressure action through the lever effect, and the compression rod end transfers the pressure to the tail part of the limiting pin so as to further push the limiting pin to move into the limiting groove, and the limiting pin and the limiting groove are engaged with each other so as to limit the movement of the vertical slide rail relative to the slide carriage, namely, the movement of the vertical slide rail relative to the vertical slider is limited, so that free up and down movement of the vertical slide rail cannot be realized.

The compression rod end of the f-shaped lever is provided with a pressing projection, the pressing projection and the f-shaped lever are matched so that when the waist ring moves backward, the head part 711 of the limiting pin is always pressed against the compression rod end of the f-shaped level without contacting the pull rod end.

Preferably, the bottom of the vertical slide rail is provided with a sittable device including a bearing rod and a folded plate, the folded plate is connected with a second pull wire, the bearing rod is rotatably connected with the folded plate, the other end of the second pull wire is connected with the vertical slider, and the folded plate is provided with a seat.

By the arrangement of the bearing rod and the folded plate, when the vertical slide rail is moving downward, at the moment when the motion is to a certain extent, the folded plate is pulled by the second pull wire to rotate around at the joint of the bearing rod and the folded plate, and the seat on the folded plate is also rotated to the horizontal position convenient for a person to sit down and rest.

The invention has following advantages:

1. The present invention has simple structure, small volume, light weight, simple operation and convenient use.
2. People with different body shapes can also achieve the same exercise experience by sliding and positioning the adjusting support; and the present invention can limit the displacement in the vertical direction during the forward movement of people, so as to protect the human body and prevent the human body from falling down.
3. Through the rotation between the support arm and the chassis, people can move and walk in any direction.
4. The free up and down movement and the free back and forth movement of the human body can be realized through the two-dimensional free motion adapting mechanism, and the buffering role can be played by the arrangement of the buffering spring, so that the safety is improved.
5. Through the limiting mechanism in the two-dimensional free motion adapting mechanism, the movement in the up-down direction is limited when a person moves forward and backward, so that the person is prevented from falling down due to unstable center of gravity when moving forward and backward, and the safety of the platform is improved.
6. Through the arrangement of the seat device, when a person is squatting, there is a seat convenient for the person to sit down, greatly reducing the loss of the physical strength for stabilizing the center of gravity during the squatting for a long time, bringing a better gaming experience.

Figure 1:
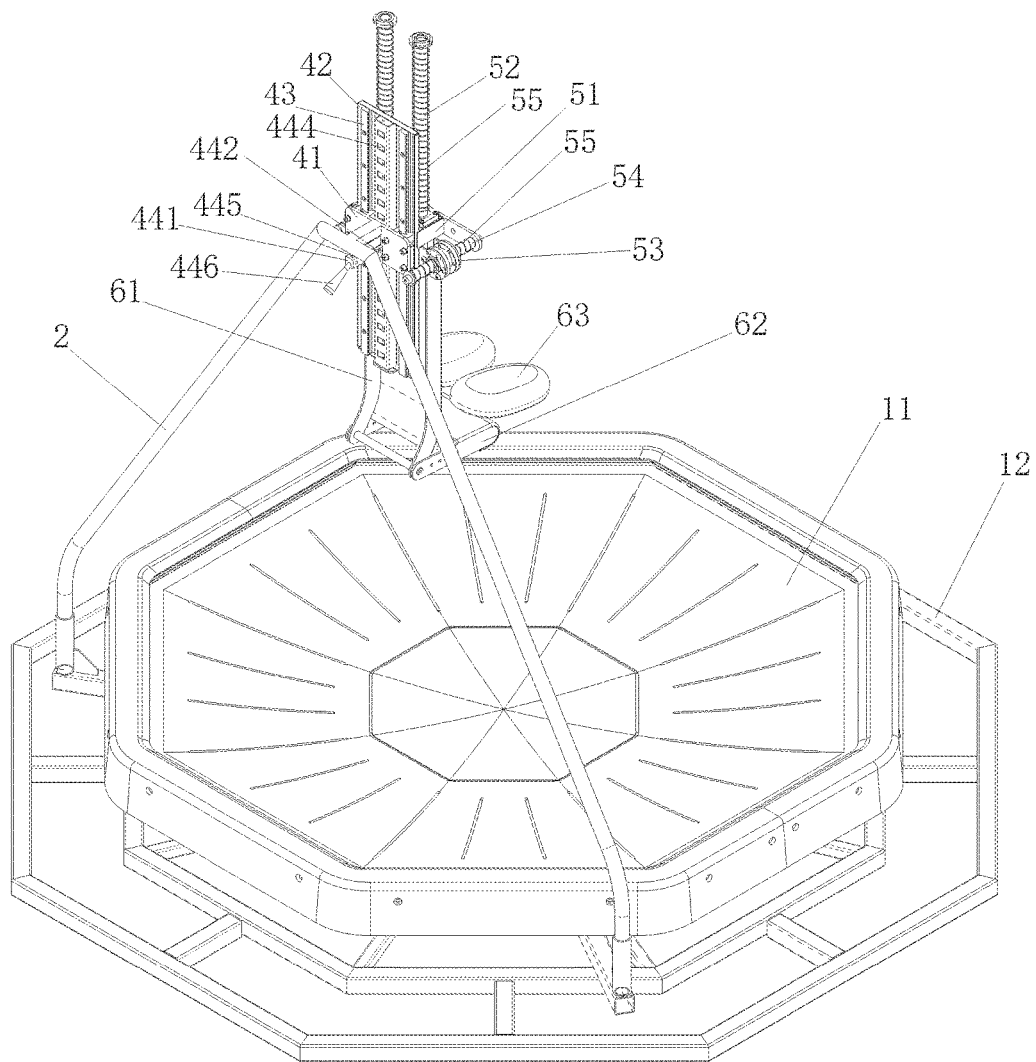
FIG. 1 is a perspective view of the present invention without the waist ring.

In the drawings: 11—chassis, 12—bottom support, 2—support arm, 3—waist ring, 31—leg sleeve, 41—slide block, 42—slide carriage, 43—slide rail, 441—rotating pin, 442—rotating shaft, 443—positioning stop, 444—positioning groove, 445—first return spring, 446—handle, 447—tail part of rotating pin, 448—head part of rotating pin, 51—vertical slider, 52—vertical slide rail, 53—horizontal slider, 54—horizontal slide rail, 55—retarding spring, 61—bearing rod, 62—folded plate, 63—seat, 64—second pull wire, 711—head part of limiting pin, 712—tail part of limiting pin, 72—f-shaped lever, 721—compression rod end, 722—pull rod end, 73—shaft, 74—second return spring, 75—pull wire fixing hole, 76—limiting groove.

DETAILED DESCRIPTION OF THE EMBODIMENTS

Specific embodiments of the present invention are further described below with reference to the accompanying drawings. It should be noted herein that the description of the embodiments is intended to assist in understanding the present invention, but not to limit the present invention. Furthermore, the technical features involved in the various embodiments of the present invention described below can be combined with each other as long as they don't conflict with each other.

Embodiment 1

Figure 2:
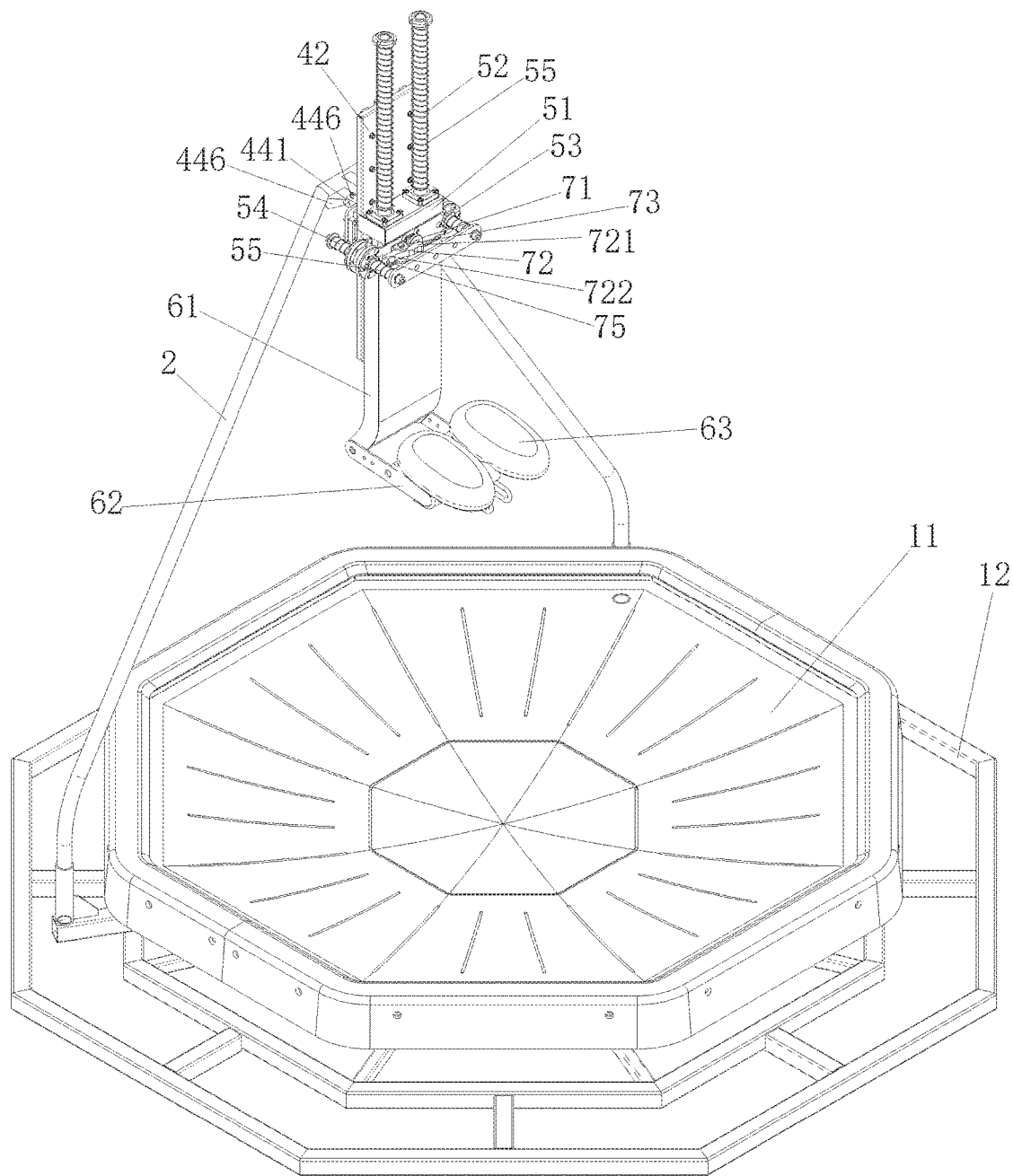
FIG. 2 is a perspective view of another aspect of the present invention without the waist ring.
Figure 3:
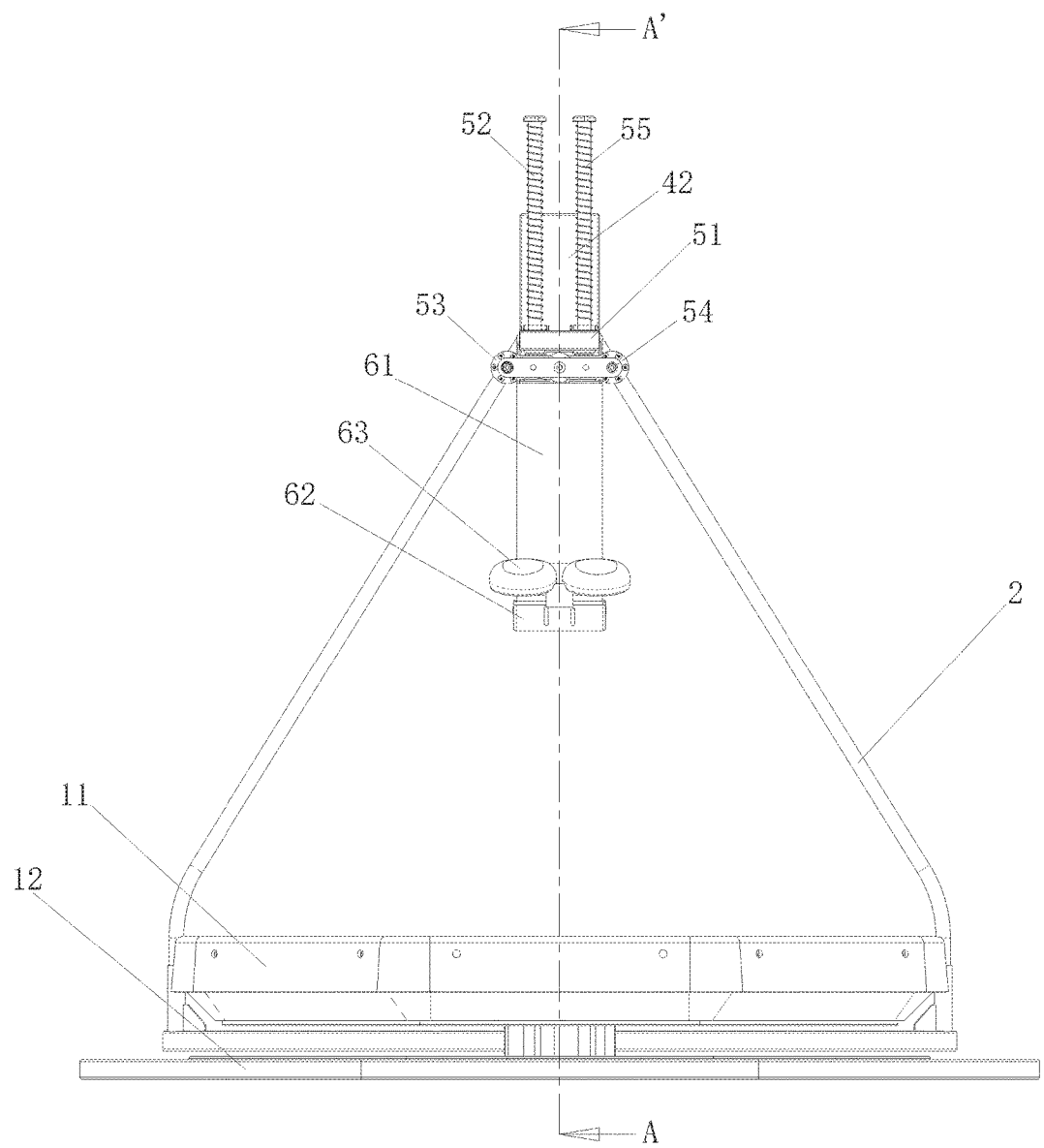
FIG. 3 is a front view of the present invention without the waist ring.
Figure 4:
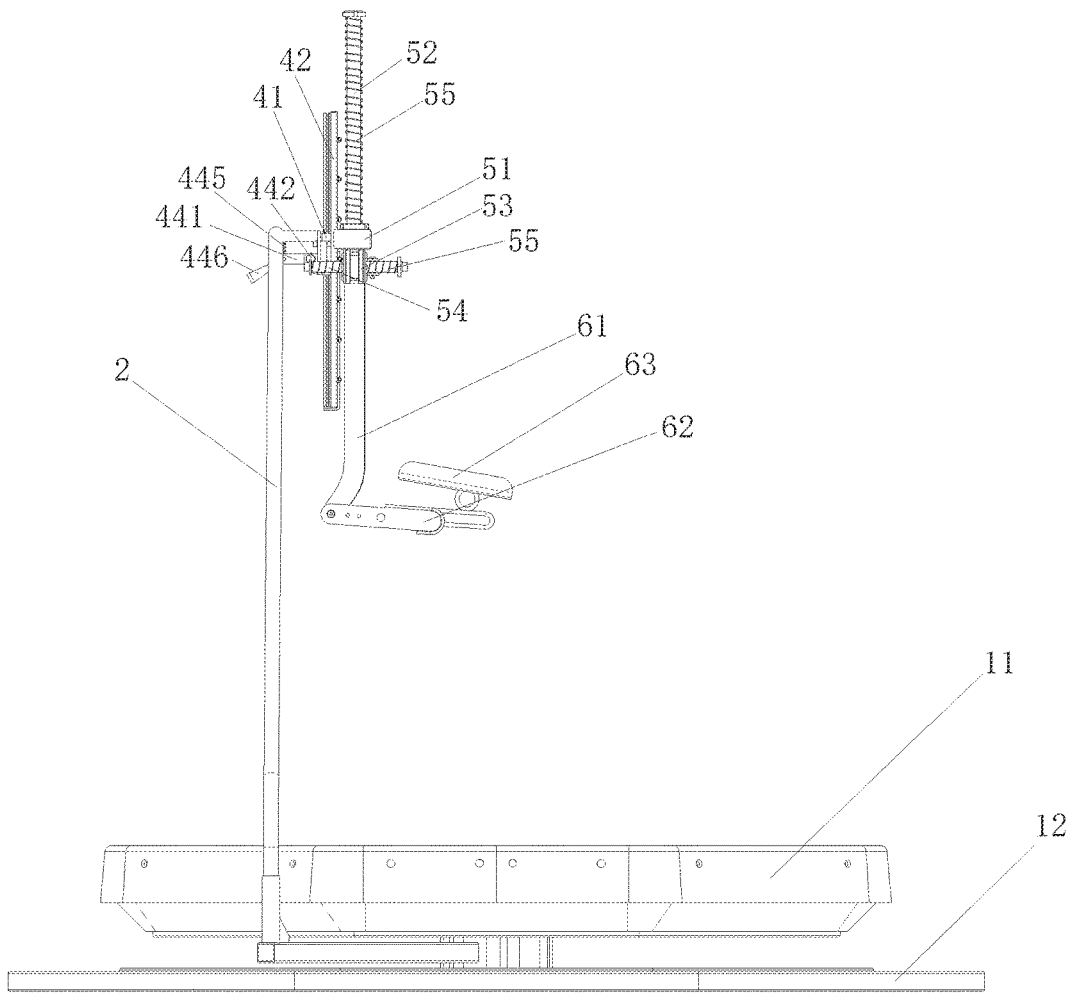
FIG. 4 is a side view of the present invention without the waist ring.
Figure 5:
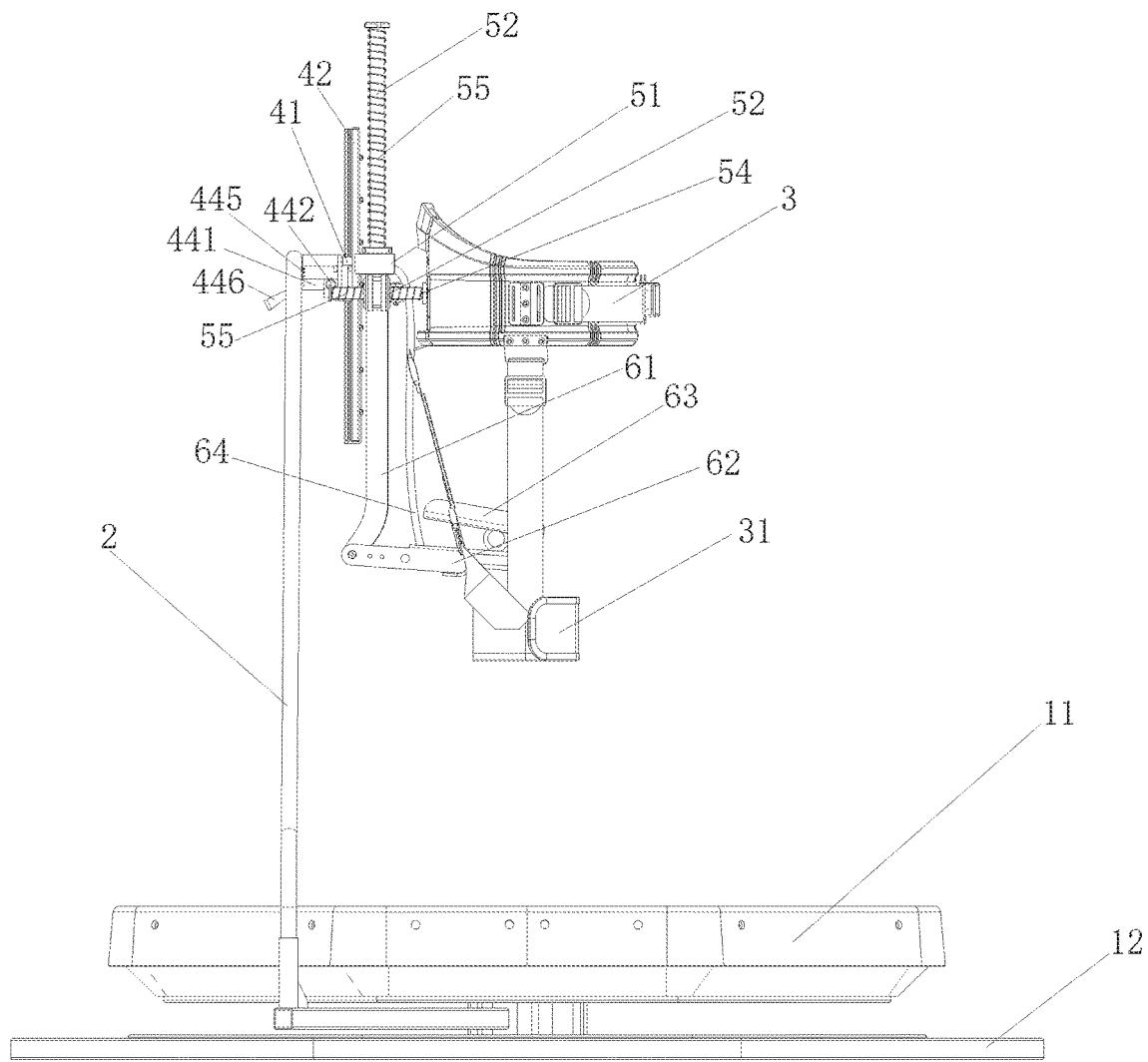
FIG. 5 is a side view of the present invention with the waist ring.
Figure 6:
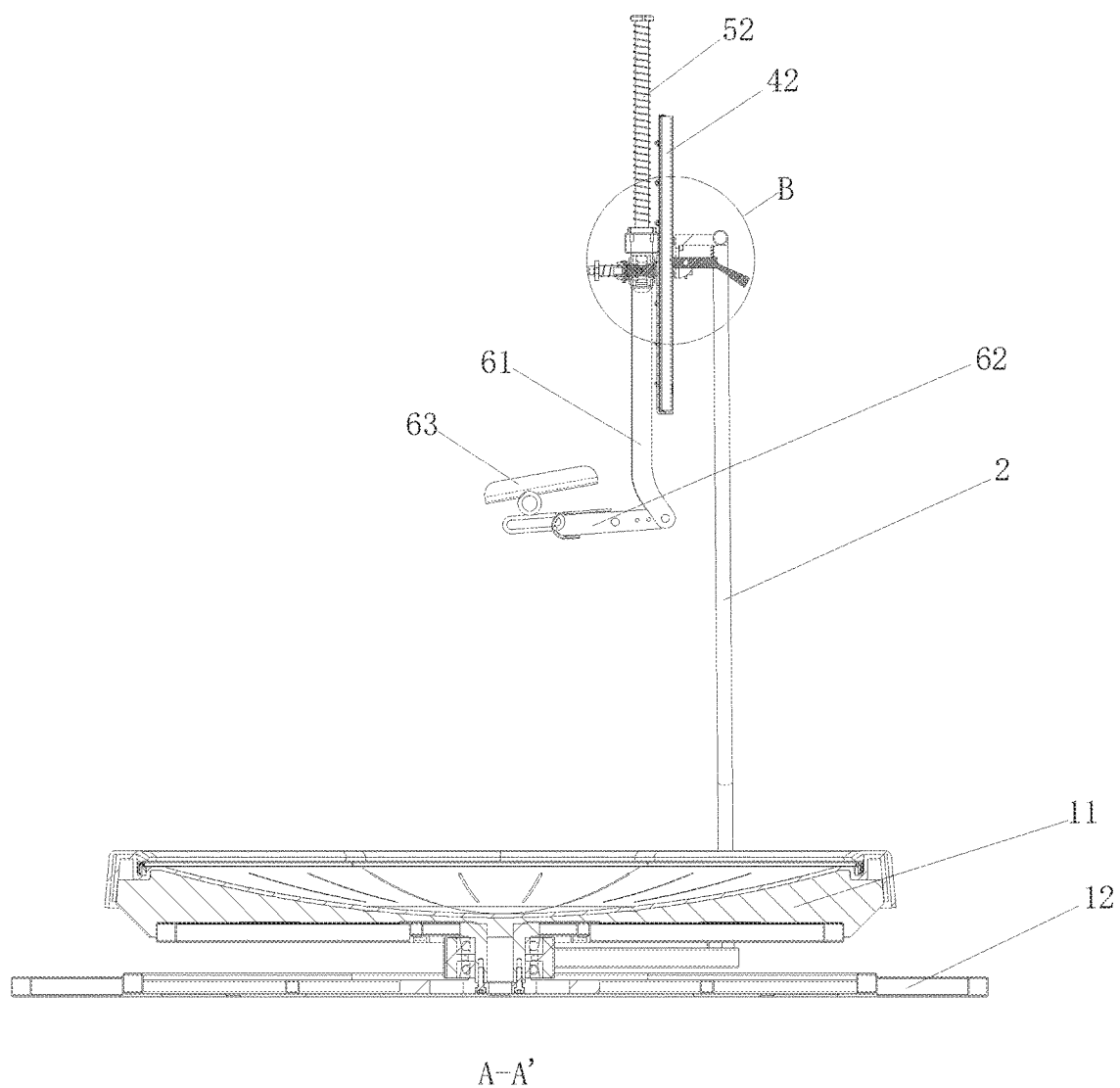
FIG. 6 is a sectional view of A-A' of FIG. 3.
Figure 7:
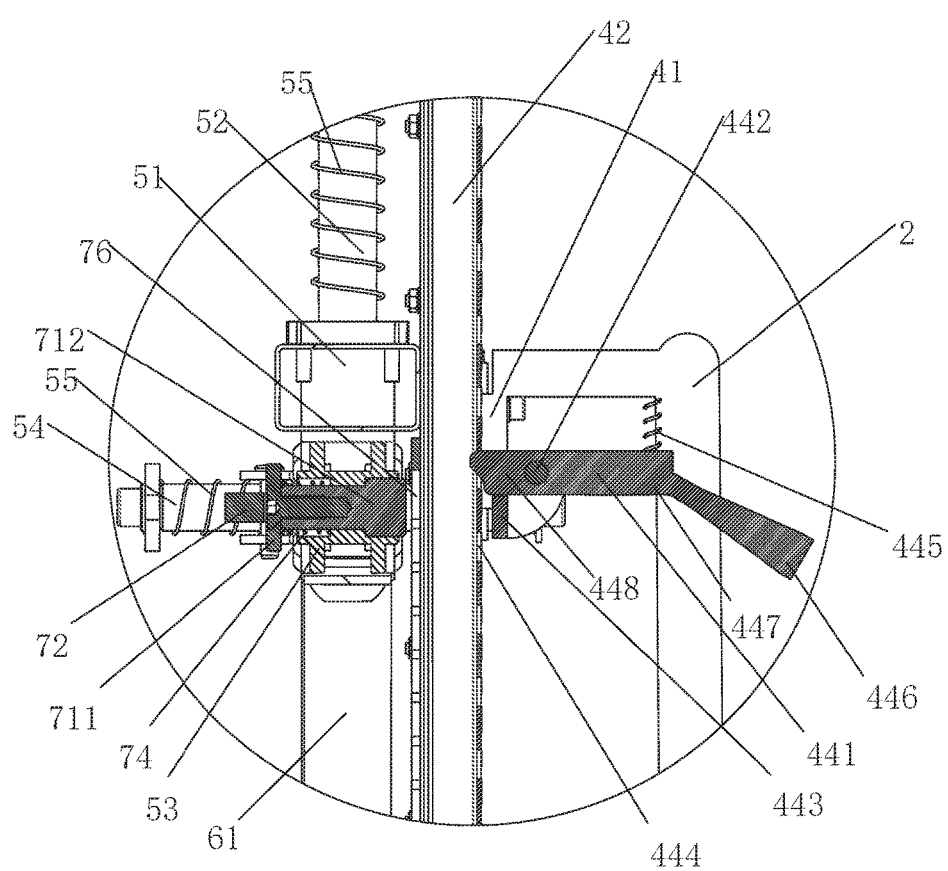
FIG. 7 is an enlarged view at B in FIG. 6.

As shown in FIGS. 1 to 7, the sittable universal motion platform includes the chassis 11, the support arm 2 and the waist ring 3. The support arm 2 is rotationally connected with the chassis 11, and the support arm 2 is provided with an adjusting support including slide carriage 42 and slide block 41. The slide block 41 is slidingly connected with the slide carriage 42, the slide block 41 is fixed on the support arm 2. The slide carriage 42 is connected with the waist ring 3, and the positioning device is arranged on the adjusting support. The chassis 11 is a concave plate with smooth surface, the bottom of the chassis 11 is provided with the bottom support 12 which is rotationally connected with the chassis 11, the support arm 2 is rotationally connected with the bottom support 12, the bottom of the support arm 2 is provided with an adaptive folding rod which is connected with the bottom support 12, and the adaptive folding rod is rotationally connected with the bottom support 12. The slide carriage 42 is provided with slide rails 43, the slide block 41 is provided with chutes which match with the slide rails 43; the number of slide rails can be two, and the number of the corresponding chutes is also two; and the positioning device includes a positioning pin and positioning grooves 444 which are matched with each other and conditionally clamped, the positioning pin is rotationally connected with the slide block 41, the positioning grooves 444 are arranged on the slide carriage 42; and a plurality of positioning grooves 444 are arranged in the vertical direction so as to adapt to people with different heights. The positioning pin includes the rotating pin 441, the positioning stop 443 and the shaft 442, the shaft 442 passes through the rotating pin 441 and is rotationally connected with the rotating pin 441, the positioning stop 443 limits the unidirectional rotation of the rotating pin 441, so that the rotating pin 441, the positioning grooves 444 and the positioning stop 443 can be kept fixed; and the shaft 442 is fixed on the slide block 41; the tail part 447 of the rotating pin 441 is provided with a handle 446 which is convenient to rotate the rotating pin 441. The positioning pin is provided with first return spring 445 which is a tension spring arranged on the tail part 447 of the rotating pin 441 and pulls the tail part 447 of the rotating pin 441, so that the rotating pin 441 also generates an anticlockwise rotation tendency, and the head part 448 of the rotating pin 441 also keeps close to the positioning stop 443; the head part 448 of the rotating pin 441 that protrudes into the positioning groove 444 is provided with bevel structure, which is a curved bevel structure.

The adjusting support is provided with a two-dimensional free motion adapting mechanism including a vertical motion adapting structure and a horizontal motion adapting structure. The vertical motion adapting mechanism includes vertical slide rail 52 and vertical slider 51; the vertical slide rail 52 and the vertical slider 51 are in sliding connection. The horizontal motion adapting structure includes horizontal slide rail 54 and horizontal slider 53; the horizontal slide rail 54 and the horizontal slider 53 are in sliding connection, the horizontal slider 53 is fixed on the vertical sliding rail 52, the horizontal slide rail 54 is connected to the waist ring 3, and the vertical slider 51 is connected to the slide carriage 42. The vertical slide rail 52 and the horizontal slide rail 54 are respectively two cylindrical guide rods, the vertical slider 51 and the horizontal slider 53 can be correspondingly provided with two cylindrical holes for respectively sliding with the vertical slide rail 52 and the horizontal slide rail 54. The retarding springs 55 are both arranged on the vertical slide rail 52 and the horizontal slide rail 54. Correspondingly, springs are sleeved in front of and in rear of the horizontal slider passing through the horizontal slide rail, and the springs are sleeved above the vertical slider passing through the vertical slide rail. The two-dimensional free motion adapting mechanism includes limiting structure, wherein the limiting mechanism includes limiting pin and limiting groove 76, the limiting plate is connected and fixed with the vertical slider 51, the limiting pin penetrates through the horizontal slider 53 and is in sliding connection with the horizontal slider 53, the limiting grooves 76 are arranged on the slide carriage 42, the head part 711 of the limiting pin is clamped with the limiting grooves 76. The slide carriage 42 is parallel to the vertical sliding rail 52, and the limiting pin is parallel to the horizontal sliding rail 54. Similarly, there are a plurality of limiting grooves 76 to increase the safe range of movement of the user. The limiting mechanism further includes compression rod including f-shaped lever 72 and hinge pin 73, the hinge pin 73 passes through the f-shaped lever 72 and is rotationally connected with the f-shaped lever 72, and is fixed on the horizontal slider 53, one end of the f-shaped lever 72 presses against the head part 711 of the limiting pin, the pull rod end 722 of the f-shaped lever 72 is provided with pull wire fixing hole 75 for fixing the first pull wire, and the other end of the f-shaped lever 72 is connected to the waist ring 3 through the first pull wire. The limiting pin is I-shaped, namely the head part 711 and the tail part 712 of the limiting pin are provided with cylindrical protrusions which exceed the cross-sectional area of the limiting pin, (the size of the cylindrical protrusions of the head part 711 is matched with the limiting groove 76), the horizontal slider 53 is provided with limiting through hole, the bottom surfaces of the head part 711 and the tail part 712 of the limiting pin are both larger than the cross-sectional area of the limiting through hole, the second return spring 74 is sleeved on the limiting pin. The two ends of the second return spring 74 respectively abut against the tail part 712 of the limiting pin and the horizontal slider 53, and the second return spring 74 is a pressure spring whose force enables the head part 711 of the limiting pin to automatically return to the initial position without being subjected to other external forces. The head part 711 and the tail part 712 of the limiting pin are detachably connected; the head part 711 and the tail part 712 can be connected by threads, and the detachable connection of the head part and the tail part is convenient for the installation and replacement of the limiting pin.

The bottom of the vertical slide rail 52 is provided with sittable device which includes bearing rod 61 and folded plate 62. The folded plate 62 is connected with second pull wire 64, the bearing rod 61 is rotatably connected with the folded plate 62, the other end of the second pull wire is connected with the vertical slider 51, and the folded plate 62 is provided with seat 63.

Embodiment 2

In the second embodiment, the first return spring 445 in Embodiment 1 is set as a torsional spring sleeved on the shaft 442, and the function of the torsional spring is to give the rotating pin 441 a force for rotating anticlockwise, so that the rotating pin 441 always keeps the anticlockwise rotating close to the positioning stop without the drive of external force.

Embodiment 3

In the third embodiment, the first return spring 445 in Embodiment 1 is set as a pressure spring which is arranged below the tail part 447 of the rotating pin 441 and bounces off the tail part 447 of the rotating pin 441, so that the rotating pin 441 also generates an anticlockwise rotating tendency, and the head part 448 of the rotating pin 441 also keeps close to the positioning stop 443.

Embodiment 4

In the fourth embodiment, the second return spring 74 may also be a tension spring, both ends of which are respectively connected to the head part 711 of the limiting pin and the bottom surface of the accommodation groove close to the head part 711.

The chassis 11 is a concave plate with smooth surface, infinite walking is realized by the action of gravity on human feet, the support arm 2 is rotationally connected with the chassis 11, so that a person can move and walk in any direction, and through the design of the slide carriage 42 and the slide block 41, the waist ring 3 can move in the vertical direction relative to the support arm 2, so that the height of different users can be adjusted and the waist ring 3 can accurately correspond to the waist position of the user, the movement of the user on the chassis 11 is correspondingly mapped into a virtual game in an infinite space.

Through the arrangement of the rotating pin 441, the positioning stop 443 and the shaft 442, the rotating pin 441 rotates around the shaft 442. When the rotating pin 441 rotates to the position of the positioning stop 443, the rotating pin 441 cannot rotate further, and the head part 448 of the rotating pin 441 extends into the positioning groove 444 at this time, so the positioning groove 444 cannot move anymore, and the relative position of the slide block 41 and the slide carriage 42 is fixed.

The positioning stop 443 only blocks the rotation of the rotating pin 441 in the anticlockwise direction, but does not block the rotation in the clockwise direction, so that when the slide carriage 42 moves upward, the head part 448 of the rotating pin 441 does not block the slide carriage 42, the rotating pin 441 blocks the downward movement of the slide carriage 42 through the positioning groove 444 but doesn't limit the upward movement of the slide carriage 42.

The waist ring 3 can move up and down freely and move back and forth freely relative to the slide carriage 42 through the vertical motion adapting structure and the horizontal motion adapting structure, and the retarding spring 55 plays a buffering role in forward, backward and downward directions respectively. The waist ring 3 plays a buffering role when people move forward, move backward and squat correspondingly, and the safety of the platform is improved.

The horizontal slider 53 is provided with accommodation grooves corresponding to the positions of the head part 711 of the limiting pin and the tail part 712 of the limiting pin, both the bottom surfaces of the head part 711 of the limiting pin and the tail part 712 of the limiting pin are smaller than the bottom surface of the accommodation groove; so that the head part 711 of the limiting pin is not exposed outside the horizontal slider 53 in the stationary state, avoiding interference with the movement relative to the limiting plate, and has beautiful and appropriate appearance. The accommodation grooves arranged near the tail part 712 are used for placing the pressure spring, two ends of the press spring abut against the cylindrical projection of the tail part 712 of the limiting pin and the bottom surface of the accommodation groove respectively.

Due to the arrangement of the limiting pin and the limiting groove 76, when the waist ring 3 moves backward, once the waist ring 3 moves to a certain position, a pressure generated by the waist ring 3 is applied on the compression rod end 721 of the f-shaped lever 72, and the compression rod end 721 transfers the pressure to the tail part 712 of the limiting pin, thereby pushing the limiting pin to move further into the limiting groove 76, and the limiting pin and the limiting groove 76 are engaged with each other so as to limit the movement of the vertical slide rail 52 relative to the slide carriage 42, namely, the movement of the vertical slide rail 52 relative to the vertical slider 51 is limited, so that free up and down movement of the vertical slide rail 52 cannot be realized.

When the waist ring 3 moves forwards, once the waist ring 3 moves to a certain position, the pull rod end 722 of the f-shaped lever 72 moves forwards along with the waist ring 3 through the pulling of the first pull wire, so that pressure is applied on the compression rod end 721 through the lever effect, and the compression rod end 721 transfers the pressure to the tail part 712 of the limiting pin so as to further push the limiting pin to move into the limiting groove, and the limiting pin and the limiting groove 76 are engaged with each other so as to limit the movement of the vertical slide rail 52 relative to the slide carriage 42, namely, the movement of the vertical slide rail 52 relative to the vertical slider 51 is limited, so that free up and down movement of vertical slide rail 52 cannot be realized.

The compression rod end 721 of the f-shaped lever 72 is provided with pressing projection, the pressing projection and the f-shaped lever 72 are matched so that when the waist ring 3 moves backward, the head part 711 of the limiting pin is always pressed against the compression rod end 721 without contacting the pull rod end 722.

By the arrangement of the bearing rod 61 and the folded plate 62, when the vertical slide rail 52 is moving downward, at the moment that the motion is to a certain extent, the folded plate 62 is pulled by the second pull wire 64 to rotate around the joint of the bearing rod 61 and the folded plate 62, and the seat 63 on the folded plate 62 is also rotated to the horizontal position convenient for a person to sit down and rest.

When in use, firstly, a user puts on auxiliary shoe covers or special shoes, and then, with the assistance of an operator, the user steps on the chassis 11 and goes to the middle position of the chassis 11. The operator holds and rotates (rotates clockwise) the handle 446 on the rotating pin 441 downwards, the rotating pin 441 overcomes the action of the tension spring, rotates clockwise, the slide carriage 42 is pried a short distance and out of the positioning groove 444, the slide carriage 42 slides downwards to the bottom under the action of gravity, and meanwhile, the vertical slider 51 connected with the slide carriage 42 is grasped, and the slide carriage 42 is moved upwards, so that the waist ring 3 just reaches the waist of the user. Slowly move the slide carriage 42 upwards during the upwards movement of the slide carriage 42 to ensure that the waist ring 3 is fixed on the most suitable position of the user's waist, and the height of waist ring 3 can be adjusted according to the height of the user. The waist ring 3 also can be fixed on different positions to fit the body type of the user. After the waist ring is fixed, the user fixes the leg sleeves on two legs with the assistance of the operator, and then the user can have limitless walking and veering on the chassis 11.

When the waist ring 3 is fixed, the user can freely move on the chassis 11, when the user moves back and forth, as the user moves forwards or backwards to a certain distance, the user' center of gravity is unstable at the moment, the f-shaped lever 72 is pressed or pulled through the waist ring 3 to press the limiting pin into the limiting groove 76, at this time, the user cannot move up and down, namely squatting and jumping, thus preventing the user from slipping. When in a normal state, the user can freely squat and jump. When the user is standing, the folded plate 62 is in sagging status, and when the user is squatting, the folded plate 62 is bent under the pulling force of the second pull line 64, and the seat can be sittable under the buttock of the user by the action of the second pull line 64, so that the user can sit down and rest conveniently, which reduces the loss of the user's physical strength, assists the user to find the center of gravity, so that the user can perfectly adapt to many games that require a long squat.

The embodiments of the present invention have been described in detail above with reference to the accompanying drawings, but the present invention is not limited to the described embodiments. For those skilled in the art, many variations, modifications, substitutions and variations to the embodiments without departing from the principle and spirit of the present invention will still fall within the protection scope of the present invention.

The invention claimed is:

1. A sittable universal motion platform, comprising:
a chassis,
a support arm and
a waist ring, wherein
the support arm is rotationally connected with the chassis and provided with an adjusting support, the adjusting support comprises a slide carriage and a slide block; the slide block is slidingly connected with the slide carriage, the slide block is fixed on the support arm, the slide carriage is connected with the waist ring, and a positioning device is arranged on the adjusting support.

2. The sittable universal motion platform according to claim 1, wherein the positioning device comprises a positioning pin and a positioning groove matched with each other and conditionally clamped, and the positioning pin is rotationally connected with the slide block; the positioning groove is arranged on the slide carriage.

3. The sittable universal motion platform according to claim 2, wherein the positioning pin comprises a rotating pin, a positioning stop and a shaft, the shaft passes through the rotating pin and is rotationally connected with the rotating pin, and the positioning stop limits the unidirectional rotation of the rotating pin, so that the rotating pin, the positioning groove and the positioning stop can be kept fixed, and the shaft is fixed on the slide block.

4. The sittable universal motion platform according to claim 2, wherein a first return spring is arranged on the positioning pin.

5. The sittable universal motion platform according to claim 1, wherein the adjusting support is provided with a two-dimensional free motion adapting mechanism comprising a vertical motion adapting structure and a horizontal motion adapting structure, the vertical motion adapting mechanism comprises a vertical slide rail and a vertical slider, the vertical slide rail and the vertical slider are in sliding connection, the horizontal motion adapting structure comprises a horizontal slide rail and a horizontal slider, and the horizontal slider is fixed on the vertical sliding rail, the horizontal slide rail is connected to the waist ring, and the vertical slider is connected to the slide carriage.

6. The sittable universal motion platform according to claim 5, wherein a plurality of retarding springs are arranged on the vertical slide rail and the horizontal slide rail.

7. The sittable universal motion platform according to claim 5, wherein the two-dimensional free motion adapting mechanism comprises a limiting mechanism comprising a limiting pin and a limiting groove, the limiting plate is connected and fixed with the vertical slider, the limiting pin passes through the horizontal slider and is in sliding connection with the horizontal slider, the limiting groove is arranged on the slide carriage, the head part of the limiting pin is clamped with the limiting groove, the slide carriage is parallel to the vertical sliding rail, and the limiting pin is parallel to the horizontal sliding rail.

8. The sittable universal motion platform according to claim 7, wherein the limiting mechanism further comprises a compression rod comprising an f-shaped lever and a hinge pin, the hinge pin passes through the f-shaped lever and is rotationally connected with the f-shaped lever, and is fixed on the horizontal slider, a first end of the f-shaped lever presses against a tail part of the limiting pin, and a second of the f-shaped lever is connected to the waist ring through a first pull wire.

9. The sittable universal motion platform according to claim 7, wherein the limiting pin is I-shaped, the horizontal slider is provided with a limiting through hole, a bottom surface of the head part and a bottom surface of the tail part of the limiting pin are larger than a cross-sectional area of the limiting through hole, a second return spring is sleeved on the limiting pin, and a first end of the second return spring abut against the tail part of the limiting pin; and a second end of the second return spring abut against and the horizontal slider.

10. The sittable universal motion platform according to claim 5, wherein a bottom of the vertical slide rail is provided with a sittable device comprising a bearing rod and a folded plate, the folded plate is connected with a second pull wire, the bearing rod is rotatably connected with the folded plate, an end of the second pull wire is connected with the vertical slider, and the folded plate is provided with a seat.

* * * * *